(12) United States Patent
Nishio et al.

(10) Patent No.: US 9,691,528 B2
(45) Date of Patent: *Jun. 27, 2017

(54) FERRITE PARTICLES FOR BONDED MAGNETS, RESIN COMPOSITION FOR BONDED MAGNETS, AND MOLDED PRODUCT USING THE SAME

(71) Applicant: TODA KOGYO CORP., Hiroshima-shi, Hiroshima-ken (JP)

(72) Inventors: Yasushi Nishio, Otake (JP); Hiromitsu Sakurai, Otake (JP); Norihiro Fukushina, Otake (JP); Yasuhiko Fujii, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 330 days.

This patent is subject to a terminal disclaimer.

(21) Appl. No.: 14/389,102

(22) PCT Filed: Mar. 14, 2013

(86) PCT No.: PCT/JP2013/057213
§ 371 (c)(1),
(2) Date: Sep. 29, 2014

(87) PCT Pub. No.: WO2013/146299
PCT Pub. Date: Oct. 3, 2013

(65) Prior Publication Data
US 2015/0041702 A1 Feb. 12, 2015

(30) Foreign Application Priority Data

Mar. 30, 2012 (JP) ................. 2012-079532

(51) Int. Cl.
| | | |
|---|---|---|
| H01F 1/11 | (2006.01) | |
| H01F 1/113 | (2006.01) | |
| H01F 1/01 | (2006.01) | |
| C01G 49/02 | (2006.01) | |
| C04B 35/26 | (2006.01) | |
| C04B 35/626 | (2006.01) | |
| C01G 49/00 | (2006.01) | |

(52) U.S. Cl.
CPC .......... H01F 1/01 (2013.01); C01G 49/0018 (2013.01); C01G 49/0036 (2013.01); C01G 49/02 (2013.01); C04B 35/26 (2013.01); C04B 35/6261 (2013.01); C04B 35/62645 (2013.01); H01F 1/113 (2013.01); C01P 2004/20 (2013.01); C01P 2004/61 (2013.01); C01P 2004/62 (2013.01); C01P 2006/10 (2013.01); C01P 2006/12 (2013.01); C01P 2006/42 (2013.01); C04B 2235/3213 (2013.01); C04B 2235/3215 (2013.01); C04B 2235/3409 (2013.01); C04B 2235/5409 (2013.01); C04B 2235/5436 (2013.01); Y10T 428/2982 (2015.01)

(58) Field of Classification Search
CPC .................. C01G 49/02; H10F 1/01
See application file for complete search history.

(56) References Cited

U.S. PATENT DOCUMENTS

| | | | |
|---|---|---|---|
| 5,328,793 | A | 7/1994 | Misawa et al. |
| 5,599,627 | A | 2/1997 | Aoki et al. |
| 6,017,631 | A | 1/2000 | Yamamoto et al. |
| 6,099,957 | A | 8/2000 | Yamamoto et al. |
| 2002/0168523 | A1 | 11/2002 | Uchida et al. |
| 2010/0065771 | A1 | 3/2010 | Fujii et al. |
| 2012/0015189 | A1 | 1/2012 | Suenaga et al. |
| 2014/0225023 | A1 | 8/2014 | Fujii et al. |

FOREIGN PATENT DOCUMENTS

| | | |
|---|---|---|
| EP | 0 540 278 | 5/1993 |
| EP | 0 652 490 | 5/1995 |
| EP | 652490 | * 5/1995 |
| EP | 0 863 501 | 9/1998 |
| JP | 55-145303 | 11/1980 |
| JP | 61-191004 | 8/1986 |
| JP | 62-273573 | 11/1987 |
| JP | 63-55122 | 3/1988 |
| JP | 3-218606 | 9/1991 |
| JP | 2000-357606 | 12/2000 |
| JP | 2002-308629 | 10/2002 |
| JP | 2003-207950 | 7/2003 |
| JP | 2005-268729 | 9/2005 |
| JP | 2007-214510 | 8/2007 |
| JP | 2008-160062 | 7/2008 |
| JP | 2008-277792 | 11/2008 |
| JP | 2008-160052 | 7/2009 |
| JP | 2009-252906 | 10/2009 |
| JP | 2010-263201 | 11/2010 |
| WO | WO 2013/146299 | 10/2013 |

OTHER PUBLICATIONS

Extended European Search Resort issued in Application No. 13767468.5 dated Nov. 5, 2015.

(Continued)

Primary Examiner — Carol M Koslow
(74) Attorney, Agent, or Firm — Nixon & Vanderhye P.C.

(57) ABSTRACT

The present invention relates to ferrite particles for bonded magnets having a bulk density of not more than 0.75 g/cm$^3$ and a degree of compaction of not less than 65%, a resin composition for bonded magnets using the ferrite particles and the composition, and a rotor. The ferrite particles for bonded magnets and the resin composition for bonded magnets according to the present invention are capable of providing a bonded magnet molded product having a good tensile elongation and an excellent magnetic properties.

5 Claims, No Drawings

(56) References Cited

OTHER PUBLICATIONS

International Preliminary Examination Report in PCT/JP2013/057213 dated Oct. 9, 2014.
International Search Report for PCT/JP2013/057213 mailed Jun. 4, 2013.
International Preliminary Report on Patentability issued in PCT/JP2014/076066 dated Apr. 5, 2016.
International Search Report issued in PCT/JP2014/076066 dated Jan. 13, 2015.
Extended European Search Report issued in App. No. 14850524.1 dated Mar. 14, 2017.
Ozkän et al., "The Effect of $B_2O_3$ Addition on the Direct Sintering of Barium Hexaferrite," *Journal of the European Ceramic Society*, vol. 14: 351-358 (1994).

\* cited by examiner

FERRITE PARTICLES FOR BONDED MAGNETS, RESIN COMPOSITION FOR BONDED MAGNETS, AND MOLDED PRODUCT USING THE SAME

This application is the U.S. national phase of International Application No. PCT/JP2013/57213 filed 14 Mar. 2013 which designated the U.S. and claims priority to JP 2012-79532 filed 30 Mar 2012, the entire contents of each of which are hereby incorporated by reference.

TECHNICAL FIELD

The present invention relates to ferrite particles for bonded magnets and a resin composition for bonded magnets which are capable of producing a bonded magnet molded product having an excellent tensile elongation, as well as a bonded magnet molded product such as a rotor using the ferrite particles and the resin composition.

BACKGROUND ART

As well known in the art, bonded magnets have many advantages such as light weight, good dimensional accuracy, and facilitated mass-production of molded products having even a complicated shape as compared to sintered magnets, and, therefore, have been extensively used in various applications such as toys, office equipments, audio equipments and motors.

As the magnetic particles usable in the bonded magnets, there are known rare earth element magnet particles such as typically Nd—Fe—B-based alloy particles, or ferrite particles. The rare earth element magnet particles have high magnetic properties, but are expensive, resulting in limited applications thereof. On the other hand, the ferrite particles are somewhat deteriorated in magnetic properties as compared to the rare earth element magnet particles, but are inexpensive and chemically stable and, therefore, have been used in more extensive applications.

The bonded magnets have been usually produced by kneading a rubber or a plastic material with magnetic particles and then molding the resulting kneaded material in a magnetic field or by using a mechanical means.

In recent years, with the enhancement in performance of various materials or equipments including an improved reliability, there is also an increasing demand for a high performance of bonded magnets used therein including enhancement in strength and magnetic properties of the bonded magnets.

More specifically, the bonded magnet molded products obtained by injection molding, etc., are also required to exhibit a good mechanical strength capable of withstanding severe conditions when used in various applications.

For example, in the applications of motors in which a rotating rotor having a shaft is used, since the shaft is inserted into the rotor machined into various sizes and complicated shapes, the rotor is required to have a high tensile elongation characteristic. With respect to the magnetic properties of the rotor, there have been required not only an increased level of a surface magnetic force but also a less degree of demagnetization induced owing to a magnetic field generated by a current supplied from a coil, in particular, as an important factor technology for obtaining a high-performance motor characteristics.

For this reason, ferrite particles used in the bonded magnets as well as resin compositions for the bonded magnets which comprise the ferrite particles and an organic binder are also required to satisfy the above requirements.

Conventionally, ferrite particles for bonded magnets and resin compositions for bonded magnets which comprise the ferrite particles and the organic binder have been improved variously. For example, there are known the method of producing ferrite particles by using an alkaline metal compound or an alkaline earth metal compound as a flux (Patent Literature 1); the method of controlling a particle size distribution of ferrite particles (Patent Literature 2); the method of producing a bonded magnet using ferrite magnetic particles comprising an alkaline earth metal as a constituting component and having an average particle diameter of not less than 1.50 µm and a melt flow rate of not less than 91 g/10 min (Patent Literature 3); the method of controlling properties of compacted calcined particles obtained by producing particles having an average particle diameter of not more than 2.5 µm and a specific surface area of not less than 1.25 m$^2$/g and then subjecting the resulting particles to annealing and further to compaction, so as to satisfy the conditions of Ra<2.5 µm and Ra-Da<0.5 µm wherein Ra (µm) represents an average particle diameter of the particles as measured by a dry air dispersion laser diffraction method, and Da (µm) represents a specific surface area diameter of the particles as measured by an air permeability method (Patent Literature 4); the method of obtaining a ferrite having a large particle diameter, a clear crystal structure, a coercive force that is hardly reduced even when pressed, and an energy product of not less than 2.0 MGOe (Patent Literature 5); or the like.

CITATION LIST

Patent Literature

Patent Literature 1: Japanese Patent Application Laid-Open (KOKAI) No. 55-145303
Patent Literature 2: Japanese Patent Application Laid-Open (KOKAI) No. 3-218606
Patent Literature 3: Japanese Patent Application Laid-Open (KOKAI) No. 2005-268729
Patent Literature 4: Japanese Patent Application Laid-Open (KOKAI) No. 2007-214510
Patent Literature 5: Japanese Patent Application Laid-Open (KOKAI) No. 2010-263201

SUMMARY OF THE INVENTION

Problem to be Solved by the Invention

At the present time, the ferrite particles for bonded magnets and/or the resin compositions for bonded magnets which are capable of satisfying the above requirements have been strongly required. However, the ferrite particles and/or resin compositions capable of satisfying the above requirements to a sufficient extent have not been obtained until now.

That is, the bonded magnet molded products produced by using the ferrite particles or resin compositions for bonded magnets as described in the above Patent Literatures 1 to 5 have failed to provide those products which are excellent in all of high magnetic force, demagnetization resistance against an external magnetic field, and mechanical strength.

In consequence, an object or technical task of the present invention is to provide ferrite particles for bonded magnets and a resin composition for bonded magnets which are capable of producing a bonded magnet exhibiting a high magnetic force, a demagnetization resistance against an external magnetic field, and an excellent mechanical strength.

Means for the Solution of the Subject

The above object or technical task of the present invention can be achieved by the following aspects of the present invention.

That is, according to the present invention, there are provided ferrite particles for bonded magnets, having a bulk density of not more than 0.75 g/cm$^3$ and a degree of compaction of not less than 65% (Invention 1).

Also, according to the present invention, there are provided the ferrite particles for bonded magnets as described in the above Invention 1, wherein the ferrite particles have an average particle diameter of 0.9 to 3.0 μm (Invention 2).

Also, according to the present invention, there are provided the ferrite particles for bonded magnets as described in the above Invention 1 or 2, wherein the ferrite particles are magnetoplumbite-type ferrite particles (Invention 3).

In addition, according to the present invention, there is provided a resin composition for bonded magnets, comprising 83 to 93% by weight of the ferrite particles for bonded magnets as described in any one of the above Inventions 1 to 3, and 7 to 17% by weight of an organic binder component (Invention 4).

Further, according to the present invention, there is provided a molded product comprising the ferrite particles for bonded magnets as described in any one of the above Inventions 1 to 3, or the resin composition for bonded magnets as described in the above Invention 4 (Invention 5).

Also, according to the present invention, there is provided the molded product as described in the above Invention 5, wherein the molded product is a rotor (Invention 6).

Effect of the Invention

The ferrite particles for bonded magnets according to the present invention which are controlled to have properties as particles including a bulk density of not more than 0.75 g/cm$^3$ and a degree of compaction of not less than 65%, are magnetic particles having an excellent dispersibility in an organic binder, and therefore can be suitably used as magnetic particles for bonded magnets.

The resin composition for bonded magnets according to the present invention comprises the ferrite particles for bonded magnets, an organic binder, a silane coupling agent, etc., is capable of producing a molded product having excellent strength and magnetic properties and, therefore, can be suitably used as a resin composition for bonded magnets.

The resin composition for bonded magnets according to the present invention has an excellent tensile elongation and therefore can be suitably used as a rotor.

PREFERRED EMBODIMENTS FOR CARRYING OUT THE INVENTION

The present invention is described in detail below.

First, the ferrite particles for bonded magnets according to the present invention (hereinafter referred to merely as "ferrite particles") are explained.

The composition of the ferrite particles according to the present invention is not particularly limited as long as they are in the form of a magnetoplumbite-type ferrite, and may be either Sr-based ferrite particles or Ba-based ferrite particles. In addition, the ferrite particles may also comprise different kinds of elements such as La, Nd, Pr, Co and Zn.

The bulk density of the ferrite particles according to the present invention is not more than 0.75 g/cm$^3$. When the bulk density of the ferrite particles is more than 0.75 g/cm$^3$, it may be difficult to obtain a sufficient torque at an initial stage of kneading, so that the ferrite particles tend to be hardly dispersed in the resin. The bulk density of the ferrite particles is preferably 0.60 to 0.73 g/cm$^3$ and more preferably 0.62 to 0.72 g/cm$^3$.

The degree of compaction of the ferrite particles according to the present invention is not less than 65%. When the degree of compaction of the ferrite particles is less than 65%, the resulting composition comprising the ferrite particles compounded therein tends to be hardly bit by a kneader owing to a large volume of voids in the particles, resulting in poor packing property of the ferrite particles. The degree of compaction of the ferrite particles is preferably 65 to 75%. Meanwhile, the degree of compaction of the ferrite particles is defined by the method described in the below-mentioned Examples.

The average particle diameter of the ferrite particles according to the present invention is preferably 0.9 to 3.0 μm. When the average particle diameter of the ferrite particles is out of the above-specified range of 0.9 to 3.0 μm, the ferrite particles tend to be hardly packed with a high density when being formed into a bonded magnet, so that it may be difficult to produce a bonded magnet having high magnetic properties. The average particle diameter of the ferrite particles is more preferably 0.9 to 2.5 μm and still more preferably 1.0 to 2.0 μm.

The BET specific surface area value of the ferrite particles according to the present invention is preferably 1.4 to 2.0 m$^2$/g.

The particle shape of the ferrite particles according to the present invention is a generally hexagonal plate shape. The average thickness of the plate-shaped ferrite particles as observed by a scanning electron microscope is preferably 0.2 to 1.0 μm. When the average thickness of the plate-shaped ferrite particles is out of the above-specified range, the resulting ferrite particles tend to be hardly packed with a high density when being formed into a bonded magnet, so that it may be difficult to produce a bonded magnet having high magnetic properties. The average thickness of the plate-shaped ferrite particles is more preferably 0.3 to 1.0 μm and still more preferably 0.4 to 0.7 μm.

The plate shape ratio (plate surface diameter/thickness) of the ferrite particles according to the present invention is expressed by a ratio between an average plate surface diameter and an average thickness both measured by observation using a scanning electron microscope, and is preferably 1.0 to 10.

The saturation magnetization value σs of the ferrite particles according to the present invention is preferably 65.0 to 73.0 Am$^2$/kg (65.0 to 73.0 emu/g), and the coercive force Hc of the ferrite particles is preferably 206.9 to 279 kA/m (2600 to 3500 Oe). In addition, Br of the ferrite particles is preferably 160 to 200 mT (1600 to 2000 G).

Next, the process for producing the ferrite particles according to the present invention is described.

The ferrite particles according to the present invention may be produced by blending and mixing raw material particles at a predetermined mixing ratio; calcining the resulting mixed raw material particles at a temperature of 900 to 1250° C. in atmospheric air and further subjecting the particles to pulverization and washing with water; and then subjecting the resulting particles to annealing heat treatment at a temperature of 700 to 1100° C. in atmospheric air, followed by subjecting the obtained particles to compaction, grinding and finally deaggregation treatments.

The raw material particles may be appropriately selected from particles of oxides, hydroxides, carbonates, nitrates, sulfates, chlorides, etc., of various metals which are capable of forming a magnetoplumbite-type ferrite. Meanwhile, from the standpoint of improving a reactivity of the raw material particles upon calcining, the particle diameter of the raw material particles is preferably not more than 2.0 μm.

In addition, in the present invention, the mixed raw material particles are preferably calcined by adding a flux thereto. As the flux, there may be used various fluxes. Examples of the flux include $SrCl_2.2H_2O$, $CaCl_2.2H_2O$, $MgCl_2$, KCl, NaCl, $BaCl_2.2H_2O$ and $Na_2B_4O_7$. The amount of the respective fluxes added is preferably 0.1 to 10 parts by weight and more preferably 0.1 to 8.0 parts by weight on the basis of 100 parts by weight of the mixed raw material particles.

Also, in the present invention, $Bi_2O_3$ may be added to and mixed in the mixed raw material particles or the particles obtained by calcining and then pulverizing the raw material particles.

Meanwhile, in the present invention, from the standpoint of well controlling the particle size distribution or mean volume diameter, larger particles and smaller particles may be used in the form of a mixture thereof.

The compaction and grinding treatments are conducted by rolling two heavy rollers on a stationary horizontal disk. These treatments are conducted by using compaction and grinding actions of the rollers, whereby voids in the particles are reduced, and the particles are compacted into an aggregating condition. Examples of the treatment apparatus usable in the compaction and grinding treatments include a sand mill, an edge runner, an attritor and a roller mill.

The deaggregation treatment as the final treatment is a treatment in which the compacted aggregated particles produced by the compaction and grinding treatments are dispersed or deaggregated by applying s relatively small force thereto to break aggregation of the particles. The deaggregation treatment may be conducted by using an impact-type crusher such as a hammer mill and a pin mill. Meanwhile, the impact-type crusher may be equipped therein with a classification mechanism such as a screen.

Next, the resin composition for bonded magnets using the ferrite particles according to the present invention is described.

The resin composition for bonded magnets according to the present invention can be produced by mixing and kneading the ferrite particles with an organic binder component and a silane coupling agent component such that the amount of the ferrite particles contained in the resin composition for bonded magnets is 83 to 93 parts by weight, and the total amount of the organic binder component and the silane coupling agent component contained in the resin composition for bonded magnets is 17 to 7 parts by weight.

The organic binder used in the present invention is not particularly limited as long as it may be usually used in conventional bonded magnets. The organic binder usable in the present invention may be appropriately selected from rubbers, vinyl chloride resins, ethylene-vinyl acetate copolymer resins, ethylene-ethyl acrylate copolymer resins, PPS resins, polyamide (nylon) resins, polyamide elastomers and polymeric fatty acid-based polyamides, depending upon the applications thereof. Among these organic binders, in the case where it is intended to preferentially achieve good strength and rigidity of the resulting molded product, the polyamide resins can be more suitably used. In addition, if required, a known mold release agent such as zinc stearate and calcium stearate may be added to the organic binder.

In the present invention, as the silane coupling agent, there may be used those silane coupling agents comprising, as functional groups, any one of a vinyl group, an epoxy group, an amino group, a methacryl group and a mercapto group, as well as any one of a methoxy group and an ethoxy group. Among these silane coupling agents, preferred are those silane coupling agents comprising an amino group and a methoxy group or those silane coupling agents comprising an amino group and an ethoxy group.

The resin composition for bonded magnets according to the present invention has a residual magnetic flux density Br of preferably not less than 230 mT (2300 G) and more preferably not less than 235 mT (2350 G), a coercive force iHc of preferably 206.9 to 278.5 kA/m (2600 to 3500 Oe) and more preferably 214.9 to 258.6 kA/m (2700 to 3250 Oe), and a maximum energy product BHmax of preferably not less than 10.3 $kJ/m^3$ (1.30 MGOe) and more preferably not less than 10.7 $kJ/m^3$ (1.35 MGOe), as measured by the below-mentioned methods for measuring magnetic properties.

Next, the process for producing the resin composition for bonded magnets by using the ferrite particles, the resin binder and the silane coupling agent according to the present invention is described.

The resin composition for bonded magnets according to the present invention may be produced by any suitable known processes used for producing the conventional resin compositions for bonded magnets. For example, the silane coupling agent, etc., may be added to and uniformly mixed with the ferrite particles according to the present invention, and then the organic binder component may be further uniformly mixed with the resulting mixture. Thereafter, the thus obtained mixture is melted and kneaded using a kneading extruder, etc., and the resulting kneaded material is pulverized or cut into granules or pellets.

The amount of the silane coupling agent added is 0.15 to 3.5 parts by weight and preferably 0.2 to 3.0 parts by weight on the basis of 100 parts by weight of the ferrite particles according to the present invention.

Next, the test piece molded product for evaluation of a tensile elongation according to the present invention is described.

The test piece molded product may be produced by the following method. That is, the ferrite magnetic particles for bonded magnets, the organic binder component, etc., are previously uniformly mixed with each other, and/or melted and kneaded after being mixed together, and then pulverized or cut into pellets to prepare a resin composition for bonded magnets. The resulting resin composition is injected while being kept in a molten state into a cavity of a metal mold at 80° C., thereby obtaining the test piece molded product having an overall length of 175 mm, an overall width of 12.5 mm and a thickness of 3.2 mm.

<Function>

The reason why the molded product produced from the ferrite particles and/or the resin composition for bonded magnets according to the present invention can exhibit an excellent tensile elongation by controlling a bulk density and a degree of compaction of the ferrite particles to not more than 0.75 $g/cm^3$ and not less than 65%, respectively, is considered by the present inventors as follows, although not clearly determined yet.

That is, it is considered that by controlling a bulk density and a degree of compaction of the ferrite particles according to the present invention to not more than 0.75 g/cm³ and not less than 65%, respectively, the resin mixture having a good packing property can be readily bit by a kneader and adequately loaded with an initial torque so that an ideal dispersion condition of the ferrite particles in the organic binder can be attained.

It is considered that since the resin composition for bonded magnets according to the present invention comprises 83 to 93% by weight of the above ferrite particles for bonded magnets and 7 to 17% by weight of the organic binder component, the ferrite particles and the organic binder can be held in the resin composition under a uniform and ideal dispersion condition.

EXAMPLES

The typical examples of the present invention are described below.

The average particle diameter of the ferrite particles according to the present invention was measured using a powder specific surface area measuring apparatus "SS-100" manufactured by Shimadzu Corp.

The BET specific surface area of the ferrite particles according to the present invention was measured using a fully-automatic specific surface area analyzer "Macsorb model-1201" manufactured by Mountech Co., Ltd.

The compacted (compressed) density of the ferrite particles according to the present invention was determined as a density of the particles which was measured by compacting the particles under a pressure of 1 t/cm².

The bulk density of the ferrite particles according to the present invention was measured according to JIS K 5101-12-1.

The tap density of the ferrite particles according to the present invention was measured according to JIS K 5101-12-2.

The degree of compaction of the ferrite particles according to the present invention was calculated from the following formula.

Degree of compaction=(tap density−bulk density)/tap density×100(%)

The saturation magnetic flux density Br and the coercive force iHc of the ferrite particles were determined as follows. That is, the particles were compacted by applying a pressure of 1 t/cm² thereto to obtain a compacted core, and then the magnetic properties of the thus obtained compacted core were measured in a magnetic field of 14 kOe using a "D.C. magnetization characteristic automatic recorder 3257" manufactured by Yokogawa Hokushin Denki Co., Ltd.

The melt mass flow rate (MFR) of the resin composition for bonded magnets was determined by melting the resin composition at 270° C. and measuring the MFR of the molten resin composition under a load of 10 kg, according to JIS K7210.

The molding density of a molded product produced from the resin composition for bonded magnets was determined as follows. That is, the resin composition for bonded magnets was melted in a cavity of a metal mold having a diameter of 25 mmφ and a height of 10.5 mm to mold a core, and the density of the thus molded core was measured using an electronic specific gravity meter "EW-120SG" manufactured by Yasuda Seiki Seisakusho Co., Ltd.

The water content in the resin composition for bonded magnets was measured using a trace water content analyzer "AQ-7" manufactured by Hiranuma Sangyo Co., Ltd., equipped with a water vaporization device "EV-6" manufactured by Hiranuma Sangyo Co., Ltd.

The magnetic properties of the resin composition for bonded magnets (including a residual magnetic flux density Br, a coercive force iHc, a coercive force bHc and a maximum energy product BHmax) were determined as follows. That is, the resin composition for bonded magnets was melted in a cavity of a metal mold having a diameter of 25 mmφ and a height of 10.5 mm and magnetically oriented in a magnetic field of 9 kOe, and then the magnetic properties of the molten resin composition were measured in a magnetic field of 14 kOe using a "D.C. magnetization characteristic automatic recorder 3257" manufactured by Yokogawa Hokushin Denki Co., Ltd.

The injection moldability of the resin composition for bonded magnets was evaluated as follows. That is, the resin composition was molded using an injection molding machine "J20MII Model" manufactured by Nippon Seikosho Co., Ltd., to obtain a test piece molded product having an overall length of 175 mm, an overall width of 12.5 mm and a thickness of 3.2 mm. The injection pressures upon injection-molding the test piece were recorded to evaluate the injection moldability of the resin composition.

The tensile strength and elongation were measured according to ASTM D638-90 Standard. Specifically, the test piece was prepared using an injection molding machine "J20MII Model" manufactured by Nippon Seikosho Co., Ltd., and then the tensile strength and elongation of the test piece were measured using a computer-aided measurement control system precision universal tester "AG-1" manufactured by Shimadzu Corp.

Example 1

Production of Ferrite Particles

One hundred parts by weight of powdery $\alpha$—$Fe_2O_3$ and 15.9 parts by weight of $SrCO_3$ were weighed (molar ratio of Fe and Sr:2Fe:Sr=5.95:1), mixed with each other in an wet attritor for 30 min, and then subjected to filtration and drying. An aqueous solution of $SrCl_2.6H_2O$ and an aqueous solution of $Na_2B_4O$ were respectively added and intimately mixed in the thus obtained raw material mixed particles, and the resulting mixture was then granulated. At this time, the amounts of $SrCl_2.6H_2O$ and $Na_2B_4O$ added were 5.5% by weight and 0.5% by weight, respectively, based on the weight of the above raw material mixed particles. The resulting granulated product was calcined in atmospheric air at 1180° C. for 2 hr. The resulting calcined product was coarsely crushed, and then pulverized by a wet attritor for 30 min, followed by subjecting the resulting particles to washing with water, filtration and drying. Thereafter, a mixed solution of isopropyl alcohol and triethanol amine was added to the particles, and further the particles were pulverized using a vibration mil for 30 min. At this time, the mixed solution was added in such an amount that the amounts of isopropyl alcohol and triethanol amine added were 0.2% by weight and 0.1% by weight, respectively, based on the above wet-pulverized dried product. Then, the resulting pulverized product was subjected to heat treatment in atmospheric air at 950° C. for 1.5 hr. Thereafter, the resulting particles were subjected to compaction and grinding treatments using a sand mil under an applied load of 45 kg/cm for 30 min, and further subjected to deaggregation treatment using a pin mill.

The production conditions used above are shown in Table 1, and properties of the obtained magnetic particles for bonded ferrite magnets are shown in Table 2.

Example 2

The same procedure as in the above Example was conducted except that the composition, kinds and amounts of additives added, etc., were changed variously, thereby producing ferrite particles.

The production conditions used above are shown in Table 1, and properties of the obtained magnetic particles for bonded ferrite magnets are shown in Table 2.

Comparative Examples 1 and 3

The ferrite particles obtained after the heat treatment in Examples 1 and 2 were used as those for Comparative Examples 1 and 3, respectively.

The production conditions used above are shown in Table 1, and properties of the obtained magnetic particles for bonded ferrite magnets are shown in Table 2.

Comparative Examples 2 and 4

The ferrite particles obtained after the compaction and grinding treatments in Examples 1 and 2 were used as those for Comparative Examples 2 and 4, respectively.

The production conditions used above are shown in Table 1, and properties of the obtained magnetic particles for bonded ferrite magnets are shown in Table 2.

Example 3

Production of Resin Composition for Bonded Magnets

The ferrite particles obtained in Example 1 were weighed in an amount of 25000 g and charged into a Henschel mixer, and an aminoalkyl-based silane coupling agent was added thereto in an amount of 0.5% by weight based on the weight of the ferrite particles and mixed with each other for 20 min until a uniform mixture was obtained. In addition, 2817 g of a 12-nylon resin having a relative viscosity of 1.60 was charged into the resulting mixture and further mixed with each other for 30 min, thereby preparing a mixture of a resin composition for bonded magnets.

The resulting mixture of the resin composition for bonded magnets was fed at a constant rate into a twin-screw kneader and kneaded therein at a temperature capable of melting the 12-nylon resin. The obtained kneaded material was taken out from the kneader in the form of strands, and cut into pellets having a size of 2 mmφ×3 mm, thereby obtaining a resin composition for bonded magnets in the form of pellets.

The production method and properties of the thus obtained resin composition for bonded magnets are shown in Table 3.

Example 4

The resin composition for bonded magnets comprising the ferrite particles obtained in Example 2, the 12-nylon resin and the silane coupling agent was produced in the same manner as in Example 3 except for variously changing the amounts of the 12-nylon resin, the silane coupling agent and a release agent.

Properties of the thus obtained resin composition for bonded magnets are shown in Table 3.

Comparative Examples 5 and 6

The resin compositions for bonded magnets comprising variously obtained ferrite particles, the 12-nylon resin and the silane coupling agent were produced in the same manner as in Example 3.

Properties of the thus obtained resin composition for bonded magnets are shown in Table 3.

Comparative Examples 7 and 8

The resin compositions for bonded magnets comprising variously obtained ferrite particles, the 12-nylon resin and the silane coupling agent were produced in the same manner as in Example 4.

Properties of the thus obtained resin composition for bonded magnets are shown in Table 3.

Example 5

Molding of Test Piece Molded Product

The resin composition for bonded magnets obtained in Example 3 was dried at 100° C. for 3 hr, melted at 300° C. in an injection molding machine, and injection-molded into a metal mold set at 80° C. for an injecting time of 0.3 sec, thereby preparing a test piece molded product having an overall length of 175 mm, an overall width of 12.5 mm and a thickness of 3.2 mm. The injection moldability and various properties of the thus prepared test piece molded product are shown in Table 4.

Example 6

The same procedure as in Example 5 was conducted except that the resin composition for bonded magnets prepared in Example 4 was melted at 280° C., thereby preparing a test piece molded product. The injection moldability and various properties of the thus prepared test piece molded product are shown in Table 4.

Comparative Examples 9 and 10

The same procedure as in Example 5 was conducted except that various resin compositions for bonded magnets were used instead, thereby preparing test piece molded products. The injection moldability and various properties of the thus prepared test piece molded products are shown in Table 4.

Comparative Examples 11 and 12

The same procedure as in Example 6 was conducted except that various resin compositions for bonded magnets were used instead, thereby preparing test piece molded products. The injection moldability and various properties of the thus prepared test piece molded products are shown in Table 4.

TABLE 1

| Examples and Comparative Examples | Final treatment | Production of ferrite particles | | | |
|---|---|---|---|---|---|
| | | Fe raw material | | Sr raw material | |
| | | Kind | Amount (weight part) | Kind | Amount (weight part) |
| Example 1 | Deaggregation | α-Fe$_2$O$_3$ | 100 | SrCO$_3$ | 15.90 |
| Example 2 | Deaggregation | α-Fe$_2$O$_3$ | 100 | SrCO$_3$ | 16.02 |
| Comparative Example 1 | Heat treatment | Same as used in Example 1 | | | |
| Comparative Example 2 | Compaction and grinding | Same as used in Example 1 | | | |
| Comparative Example 3 | Heat treatment | Same as used in Example 2 | | | |
| Comparative Example 4 | Compaction and grinding | Same as used in Example 2 | | | |

| Examples and Comparative Examples | Production of ferrite particles | | | | |
|---|---|---|---|---|---|
| | 2Fe/Sr Molar ratio (—) | BaCl$_2$·2H$_2$O | | Na$_2$B$_4$O$_7$ | |
| | | Amount (weight part) | (wt %) | Amount added (weight part) | (wt %) |
| Example 1 | 5.95 | 6.37 | 5.5 | 0.58 | 0.50 |
| Example 2 | 5.90 | 2.90 | 2.5 | 0.29 | 0.25 |
| Comparative Example 1 | Same as used in Example 1 | | | | |
| Comparative Example 2 | Same as used in Example 1 | | | | |
| Comparative Example 3 | Same as used in Example 2 | | | | |
| Comparative Example 4 | Same as used in Example 2 | | | | |

| Examples and Comparative Examples | Production of ferrite particles | | | |
|---|---|---|---|---|
| | Calcination temperature (°C.) | Heat treatment (°C.) | Compaction and grinding treatments | |
| | | | Under applied load (kg/cm) | Deaggregation treatment Done or not done |
| Example 1 | 1200 | 950 | 45 | Done |
| Example 2 | 1150 | 950 | 45 | Done |
| Comparative Example 1 | Same as used in Example 1 | | — | Not done |
| Comparative Example 2 | Same as used in Example 1 | | 45 | Not done |
| Comparative Example 3 | Same as used in Example 2 | | — | Not done |
| Comparative Example 4 | Same as used in Example 2 | | 45 | Not done |

TABLE 2

| Examples and Comparative Examples | Properties of ferrite particles | | | | |
|---|---|---|---|---|---|
| | Bulk density (g/cm$^3$) | Tap density (g/cm$^3$) | Degree of compaction | Ps (μm) | BET (m$^2$/g) |
| Example 1 | 0.67 | 2.17 | 69.12 | 1.22 | 2.04 |
| Example 2 | 0.71 | 2.08 | 65.87 | 1.35 | 1.75 |
| Comparative Example 1 | 0.86 | 2.00 | 57.00 | 1.24 | 1.96 |
| Comparative Example 2 | 0.82 | 2.27 | 63.88 | 1.40 | 2.03 |
| Comparative Example 3 | 0.82 | 1.96 | 58.16 | 1.35 | 1.67 |
| Comparative Example 4 | 0.82 | 2.33 | 64.81 | 1.49 | 1.69 |

| Examples and Comparative Examples | Magnetic properties | | | |
|---|---|---|---|---|
| | Br | | iHc | |
| | (mT) | (G) | (kA/m) | (Oe) |
| Example 1 | 184 | 1840 | 218.0 | 2740 |
| Example 2 | 179 | 1790 | 222.8 | 2800 |
| Comparative Example 1 | 188 | 1880 | 222.0 | 2790 |
| Comparative Example 2 | 182 | 1820 | 222.0 | 2790 |
| Comparative Example 3 | 181 | 1810 | 232.4 | 2920 |
| Comparative Example 4 | 179 | 1790 | 230.0 | 2890 |

TABLE 3

| Examples and Comparative Examples | Properties of resin composition for bonded magnets | | | |
|---|---|---|---|---|
| | Kind of ferrite | MFR (g/10 min) | Molding density (g/cm$^3$) | Water content (ppm) |
| Example 3 | Example 1 | 52 | 3.57 | 96 |
| Example 4 | Example 2 | 79 | 3.51 | 61 |
| Comparative Example 5 | Comparative Example 1 | 45 | 3.57 | 96 |
| Comparative Example 6 | Comparative Example 2 | 47 | 3.57 | 107 |
| Comparative Example 7 | Comparative Example 3 | 77 | 3.52 | 67 |
| Comparative Example 8 | Comparative Example 4 | 78 | 3.52 | 56 |

| Examples and Comparative Examples | Properties of resin composition for bonded magnets | | | |
|---|---|---|---|---|
| | Br | | bHc | |
| | (mT) | (G) | (kA/m) | (Oe) |
| Example 3 | 281 | 2810 | 183.8 | 2310 |
| Example 4 | 272 | 2720 | 187.0 | 2350 |
| Comparative Example 5 | 280 | 2800 | 186.2 | 2340 |
| Comparative Example 6 | 279 | 2790 | 185.4 | 2330 |
| Comparative Example 7 | 272 | 2720 | 188.6 | 2370 |
| Comparative Example 8 | 273 | 2730 | 187.8 | 2360 |

| Examples and Comparative Examples | Properties of resin composition for bonded magnets | | | |
|---|---|---|---|---|
| | iHc | | BHmax | |
| | (kA/m) | (Oe) | (kJ/m$^3$) | (MGOe) |
| Example 3 | 227.6 | 2860 | 15.52 | 1.95 |
| Example 4 | 237.1 | 2980 | 14.72 | 1.85 |
| Comparative Example 5 | 230.8 | 2900 | 15.52 | 1.95 |

TABLE 3-continued

| | | | | |
|---|---|---|---|---|
| Comparative Example 6 | 229.2 | 2880 | 15.36 | 1.93 |
| Comparative Example 7 | 242.7 | 3050 | 14.64 | 1.84 |
| Comparative Example 8 | 240.3 | 3020 | 14.80 | 1.86 |

TABLE 4

| Examples and Comparative Examples | Resin composition for bonded magnets | Injection moldability Injection pressure (kg/cm$^2$) | Properties of test piece molded product Tensile elongation (%) | Tensile strength (Mpa) |
|---|---|---|---|---|
| Example 5 | Example 3 | 1485 | 4.84 | 61 |
| Example 6 | Example 4 | 1656 | 8.11 | 63 |
| Comparative Example 9 | Comparative Example 5 | 1604 | 3.73 | 63 |
| Comparative Example 10 | Comparative Example 6 | 1593 | 3.25 | 60 |
| Comparative Example 11 | Comparative Example 7 | 1671 | 5.57 | 62 |
| Comparative Example 12 | Comparative Example 8 | 1734 | 5.94 | 62 |

| Examples and Comparative Examples | Properties of test piece molded product | | |
|---|---|---|---|
| | Flexural strength (Mpa) | IZOD (kJ/m$^2$) | Contraction rate (%) |
| Example 5 | 119 | 22.3 | 0.697 |
| Example 6 | 128 | NB | 0.714 |
| Comparative Example 9 | 111 | 21.56 | 0.709 |
| Comparative Example 10 | 113 | 20.87 | 0.712 |
| Comparative Example 11 | 129 | NB | 0.726 |
| Comparative Example 12 | 124 | 22.97 | 0.726 |

NB: Not Break

When comparing tensile elongation values of the test piece molded products having the same composition ratios with each other, the test piece molded product obtained in Example 5 was excellent in tensile elongation as compared to those obtained in Comparative Examples 9 and 10, and the test piece molded product obtained in Example 6 was excellent in tensile elongation as compared to those obtained in Comparative Examples 11 and 12. Thus, it was confirmed that all of the test piece molded products obtained in Examples according to the present invention exhibited excellent properties.

INDUSTRIAL APPLICABILITY

Since the bonded magnet obtained by using the ferrite particles and/or the resin composition for bonded magnets according to the present invention are excellent in both flexural strength and magnetic properties, the ferrite particles and/or the resin composition according to the present invention can be suitably used as ferrite particles and/or a resin composition for bonded magnets, in particular, as those for a magnet roll.

The invention claimed is:

1. Ferrite particles for bonded magnets, having a bulk density of not more than 0.75 g/cm$^3$ and a degree of compaction of not less than 65%, wherein the ferrite particles are magnetoplumbite-type ferrite particles.
2. The ferrite particles for bonded magnets according to claim 1, wherein the ferrite particles have an average particle diameter of 0.9 to 3.0 μm.
3. A resin composition for bonded magnets, comprising 83 to 93% by weight of the ferrite particles for bonded magnets as claimed in claims 1, and 7 to 17% by weight of an organic binder component.
4. A molded product comprising the ferrite particles for bonded magnets as claimed in claim 1.
5. The molded product according to claim 3, wherein the molded product is a rotor.

* * * * *